Feb. 17, 1953  J. JUERGENS  2,628,507
AUTOMOBILE ACCELERATOR ATTACHMENT
Filed June 17, 1950
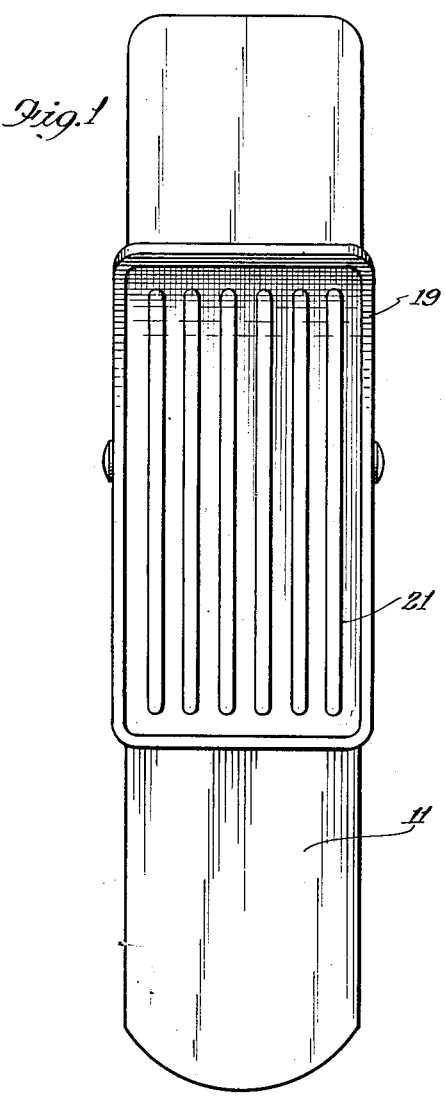
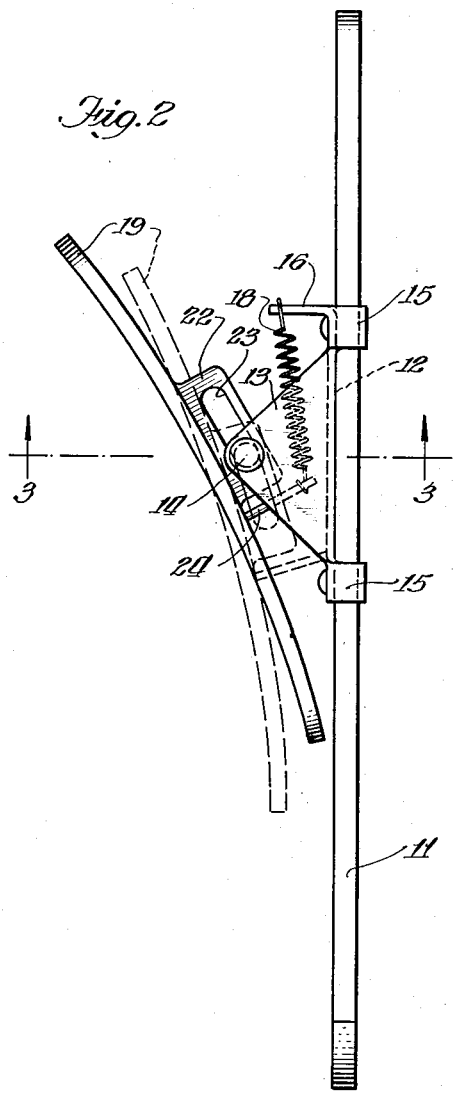
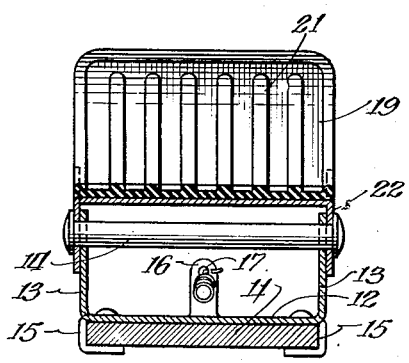
Inventor:
John Juergens
By: Alois W. Graf
Attorney Patented Feb. 17, 1953

2,628,507

UNITED STATES PATENT OFFICE 2,628,507

AUTOMOBILE ACCELERATOR ATTACHMENT

John Juergens, McHenry, Ill.

Application June 17, 1950, Serial No. 168,774

1 Claim. (Cl. 74—513)

The present invention relates to an accessory for automobiles for the accelerator pedals.

The usual foot accelerator on automobiles consists of an elongated blade hinged on its bottom and bearing against a reciprocable rod in the vicinity of its top. Customarily, the surface of such pedal is coated with rubber or similar material. This coating is placed thereon to prevent inadvertent slipping of the foot from the accelerator and also to have the appearance of the accelerator harmonize with the rubber coating of the floor board. While the rubber coating serves to prevent actual slipping of the foot from the accelerator it also prevents the foot from sliding on the accelerator pedal whenever the pedal is to be depressed.

Accelerator pedals generally have been designed with the theory that the driver's foot would have the heel resting close to the pivot point or hinge of the accelerator pedal. It of course is well known that due to different statures of individuals and other individual characteristics many people do not rest their entire foot upon the accelerator pedal. Even if the foot were so resting there still would be an effect which would tend to induce fatigue. It therefore would be highly desirable to provide some arrangement whereby operation of the accelerator pedal would be less tiresome. Furthermore, it would be desirable to provide an accelerator pedal arrangement which would engage a greater portion of the sole of the shoe than is the case where the foot is not placed with exactness and precision so that the heel is closely adjacent to the pivot or hinge of the accelerator pedal. In accordance with the present invention it is proposed to provide an attachment for an accelerator pedal whereby the foot will not have to overcome the friction between the pedal and the sole of the shoe whenever the pedal is depressed. It is furthermore contemplated that adequate support will be given to a considerable portion of the foot irrespective of the position of the heel relative to the accelerator pedal.

It therefore is an object of the present invention to provide an accessory for an automobile for the accelerator pedal which is simple to install and economical to manufacture.

It is a further object of the present invention to provide an improved arrangement for actuating the foot accelerator pedal of an automobile.

It is a still further object of the present invention to provide an improved arrangement for foot accelerator pedals of automobiles whereby a substantial portion of the sole of the foot is engaged irrespective of the placement of the heel relative to the foot accelerator pedal.

Other and further objects of the present invention subsequently will become apparent by reference to the following description taken in conjunction with the accompanying drawing wherein:

Figure 1 is a plan view of a foot accelerator pedal equipped with the accessory device therefore contemplated by the present invention;

Figure 2 is a side view of the arrangement illustrated in Figure 1; and

Figure 3 is a view as seen in the direction of the arrows along the line 3—3 of Figure 2.

Referring to the drawing, it will be seen that there has been shown an accelerator pedal 11 which in its general form is pivoted or hinged adjacent its bottom end. An accelerator rod is engaged by the pedal 11 at an intermediate point. Since the particular details of accelerator pedals are well known to those skilled in the art, and the present invention is applicable to pedals of various constructions, no details of the accelerator pedal construction need be shown or described. The present invention consists of a device having a base plate 12 provided with upstanding ear portions 13 along opposite sides. As may be seen from Figure 2 each of the ear portions 13 may be of generally triangular shape and at the apex provided with an aperture for receiving a transversely arranged bolt or rivet 14. Just beyond the upright ears or side plate portions 13 the base 12 is provided with clips 15 which are arranged to be bent under the bottom side of the accelerator pedal 11. At one end the base 12 has an upright lug 16 provided with an aperture 17 for receiving one end of a spring 18.

An auxiliary pedal 19, which preferably has a slight curved configuration, as seen in Figure 2, is provided with a suitable surface 21, such as shown in Figure 1. This surface, if desired, may be rubber covered. The pedal 19 has two depending lugs 22 having a generally rectangular configuration and being provided with an elongated slot. The elongated slot is engaged by the transversely arranged bolt or rivet 14. Depending from the underside of the pedal 19 is a lug 24 which is provided near its end with an opening for engaging the other end of the spring 18. This spring 18 normally biases the auxiliary pedal 19 to an upward position, as shown in solid lines in Figure 2. When the foot is placed upon the auxiliary pedal 19 it may be swung through an arc so that a substantial portion of the top surface 21 of the pedal 19 engages the sole of the shoe. Thus an extended surface engages the bottom of the foot and this surface is supported on a transversely arranged pin or rivet 14. Whenever the foot is moved to depress the accelerator pedal the auxiliary pedal 19 will move longitudinally along the slot 23 so as to bring about a relative movement between the auxiliary pedal 19 and the pedal 11. Thus the friction normally occurring between the bottom of the shoe and the pedal in normal operation is greatly minimized since obviously the friction of the metal end 22 on the transverse bolt or rivet 14 is appreciably less than the friction which would exist between the bottom of the shoe and the rubber covered surface of pedal 11.

Thus the force which might be exerted by the foot is appreciably less when the present invention is employed than in the conventional construction. Since less effort is required to actuate the foot accelerator guide, obviously less tension is required in the leg muscles to hold the foot accelerator in any desired position. The reduction in the tension required of course is greatly appreciated by all individuals who have occasion to drive considerable distances involving appreciable periods of time. The comfort resulting from the use of this device is difficult to express in language since the full advantage of the present invention is only appreciated by actual use. It will, however, become apparent to those skilled in the art that in accordance with the present invention means have been provided for appreciably reducing the effort required to control the position of the foot accelerator and that a greater portion of the bottom of the foot is supported irrespective of the position of the heel with respect to the lower end of the foot accelerator 11.

While for the purpose of illustrating and describing the present invention a preferred embodiment has been shown in the drawing, it is to be understood that the invention is not limited thereby since such variations in the construction and in the components employed are contemplated as may be commensurate with the spirit and scope of the invention set forth in the accompanying claim.

I claim:

An automobile accelerator pedal attachment comprising a flat metal base having outwardly extending projections adapted to be bent about the sides and bottom of said pedal, said base having two generally upright side members, a curved top member having near its longitudinal midpoint two depending sides each having longitudinally extending slots therein, a pivotal support member extending through said slots in the sides of said top member, and a spring connected between one end of said base and the opposite end of said top member to bias said member to a certain position.

JOHN JUERGENS.

REFERENCES CITED

The following references are of record in the file of this patent:

UNITED STATES PATENTS

| Number | Name | Date |
|---|---|---|
| 1,522,401 | West | Jan. 6, 1925 |
| 2,521,606 | Rodd | Sept. 5, 1950 |